United States Patent [19]

Houminer et al.

[11] Patent Number: 4,509,537
[45] Date of Patent: Apr. 9, 1985

[54] SMOKING COMPOSITIONS

[75] Inventors: Yoram Houminer; Kenneth F. Podraza, both of Richmond, Va.

[73] Assignee: Philip Morris Incorporated, New York, N.Y.

[21] Appl. No.: 482,100

[22] Filed: Apr. 4, 1983

[51] Int. Cl.$^3$ ............................................. A24B 3/14
[52] U.S. Cl. ................................. 131/276; 131/274; 260/463
[58] Field of Search ............... 131/274, 276; 560/61; 260/463

[56] References Cited

U.S. PATENT DOCUMENTS

| | | | |
|---|---|---|---|
| 3,312,226 | 4/1967 | Bavley et al. | 131/276 |
| 3,332,428 | 7/1967 | Mold et al. | 131/276 |
| 3,419,543 | 12/1968 | Mold et al. | 260/234 |
| 3,499,452 | 3/1970 | Kallianos et al. | 131/276 |
| 4,002,179 | 1/1977 | Rundberg | 131/276 |
| 4,045,464 | 8/1977 | Romano | 260/463 |
| 4,080,309 | 3/1978 | Bruns | 260/463 |
| 4,092,988 | 6/1978 | Van Auken et al. | 131/276 |

Primary Examiner—V. Millin
Assistant Examiner—Gregory Beaucage

[57] ABSTRACT

This invention provides smoking compositions which contain a monocarbonate ester compound as a flavorant additive.

In one of its embodiments, this invention provides tobacco compositions which contain a monocarbonate ester flavorant additive such as 1-phenoxycarbonyloxy-3-propanol.

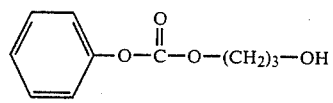

Under cigarette smoking conditions the above illustrated monocarbonate ester pyrolyzes into phenol and other products which flavor the mainstream and sidestream smoke.

11 Claims, No Drawings

SMOKING COMPOSITIONS

BACKGROUND OF THE INVENTION

A variety of flavorants have been developed and proposed for incorporation into tobacco products. Illustrative of such tobacco flavorants are those described in U.S. Pat. Nos. 3,580,259; 3,625,224; 3,722,516; 3,750,674; 3,879,425; 3,881,025; 3,884,247; 3,890,981; 3,903,900; 3,914,451; 3,915,175; 3,920,027; 3,924,644; 3,937,228; 3,943,943; 3,586,387; and the like. The tobacco flavorants include compounds such as succinic anhydride; dihydroxyacetone; substituted pyridines; cinnamic acid derivatives; isovaleric acid; 6-methylhepta-3,5-dien-2-one; 2-butyl-2-butenal; 1,3-cyclohexadiene; alpha-pyrones; substituted butyrolactones; pyrazines and thiazolidines; and the like.

The high degree of volatility and ease of sublimation of flavorant additives in tobacco products have presented problems in the manufacturing operations, and have resulted in a decreased shelf-life of the products due to losses of flavorant by evaporation on storage.

In an attempt to alleviate these problems, it has been suggested that a tobacco flavorant might be adsorbed on a suitable support, such as activated charcoal or fuller's earth, and that the resultant composition might then be added to the tobacco. Attempts to pursue this method have not been satisfactory. The flavorant yields from such adsorbents have been found to be vary low. Moreover, this method obviously necessitates incorporation of the adsorbent into the tobacco, and such a foreign material can result in an undesirable appearance as well as give rise to uneven burning of the tobacco.

More recent developments have involved incorporating a low volatility organic additive to a smoking composition, which under smoking conditions is pyrolyzed into one or more fragments that function to improve the taste and character of mainstream tobacco smoke.

U.S. Pat. No. 3,312,226 describes smoking tobacco compositions which contain an ester additive such as 1-menthyl linalool carbonate. Under smoking conditions pyrolysis of the carbonate ester releases menthol which flavors the mainstream smoke.

U.S. Pat. No. 3,332,428 and U.S. Pat. No. 3,419,543 describe smoking tobacco compositions which contain a menthyl carbonate ester of a glycol or saccharide, which under smoking conditions decomposes to release free menthol into the mainstream smoke. U.S. Pat. No. 3,499,452 discloses similar smoking tobacco compositions in which a carbonate ester additive releases flavorant volatiles other than menthol.

U.S. Pat. No. 4,092,988 describes smoking tobacco compositions which contain a flavorant-release polymeric ester additive. Under smoking conditions the release of an olefinic pyrolyzate improves the flavor and aroma of mainstream and sidestream cigarette smoke.

There is continuing research effort to develop low delivery smoking compositions which generate mainstream smoke with enhanced taste and character under smoking conditions.

Accordingly, it is an object of this invention to provide smoking compositions having incorporated therein a flavorant which is characterized by lack of mobility and/or volatility at ambient temperature.

It is another object of this invention to provide smoking tobacco compositions having incorporated therein a flavorant-release composition which under normal smoking conditions imparts improved flavor to mainstream smoke and improved aroma to sidestream smoke.

It is a further object of this invention to provide novel carbonate ester compositions which are adapted to be incorporated into tobacco compositions, and which under normal smoking conditions release a phenolic type of flavorant into cigarette smoke.

Other objects and advantages of the present invention shall become apparent from the following description and examples.

DESCRIPTION OF THE INVENTION

One or more objects of the present invention are accomplished by the provision of a smoking composition comprising an admixture of (1) combustible filler selected from natural tobacco, reconstituted tobacco and non-tobacco substitutes, and (2) between about 0.0001 and 2 weight percent, based on the total weight of filler, of a monocarbonate ester flavorant additive corresponding to the formula:

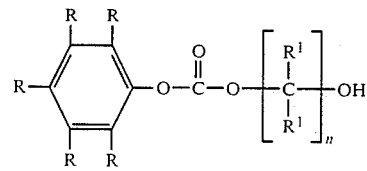

where R is a substituent selected from hydrogen, alkyl and alkoxy groups, $R^1$ is a substituent selected from hydrogen and alkyl groups, and n is an integer between 3 and about 10.

In the ester formula represented above, the R and $R^1$ alkyl and alkoxy groups are preferably those containing between about 1–6 carbon atoms, such as methyl, methoxy, ethyl, ethoxy, butyl, butoxy, isobutyl, isobutoxy, pentyl, pentoxy, 2-hexyl, 2-hexoxy, hex-5-enyl, hex-5-enoxy, and the like.

Particularly preferred monocarbonate ester flavorants are those in which the R substituents on the phenyl group in the formula above are all hydrogen, or in which one or two of the R substituents on the phenyl group instead of hydrogen are selected from methyl and methoxy radicals, and those esters in which the integer n is 3, 4 or 5.

When a present invention smoking composition is subjected to normal smoking conditions such as with cigarettes, the monocarbonate ester additive decomposes to release a volatile pyrolysis phenol component which contributes flavor-enhancing properties to the mainstream smoke:

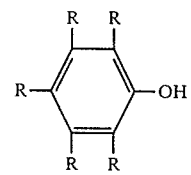

where R is a substituent selected from hydrogen, alkyl and alkoxy groups.

In some cases, the phenolic component improves the aroma of the sidestream smoke of cigarettes.

As demonstrated in Examples XIV–XV, a high yield of phenolic component is released from an invention monocarbonate ester under pyrolysis conditions. Phenols are a known class of tobacco flavorants, as reported by Leffingwell et al in a R. J. Reynolds publication (1972).

The present invention monocarbonate esters are uniquely stable and odorless compounds at ambient temperatures. In addition, the esters decompose at a relatively low pyrolysis temperature (e.g., 150°–250° C.) to release a high yield of desirable phenolic flavorant component.

This is in contrast to monocarbonate esters of glycol compounds, which as shown in Examples IX–XIII are relatively unstable at ambient temperatures and gradually decompose. This instability at room temperature precludes their use as flavorant additives in manufactured smoking products.

PREPARATION OF MONOCARBONATE ESTERS

The monocarbonate esters of the present invention can be prepared by reacting equivalent weights of a selected phenyl chloroformate compound with an appropriate dihydric alcohol compound:

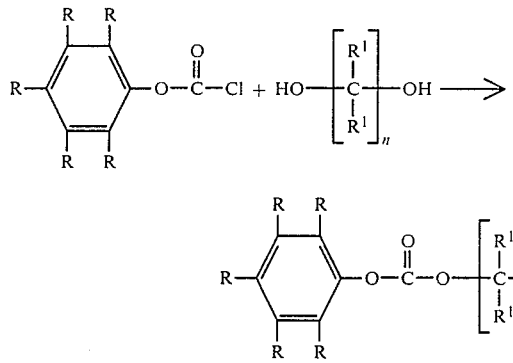

Details of organic carbonate ester synthesis are elaborated in prior art references such as U.S. Pat. No. 3,312,226 and U.S. Pat. No. 4,092,988. The present invention monocarbonate esters are readily amenable to chromatographic purification procedures.

As one of its embodiments, the present invention provides a novel class of monocarbonate ester compositions corresponding to the formula:

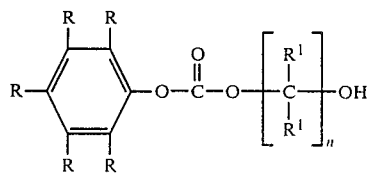

where r is a substituent selected from hydrogen, alkyl and alkoxyl groups, $R^1$ is a substituent selected from hydrogen and alkyl groups, and n is an integer between 3 and about 10.

PREPARATION OF TOBACCO COMPOSITIONS

In a further embodiment, the present invention provides a method of preparing a smoking composition which is adapted to impart improved taste and character to mainstream smoke under smoking conditions, which method comprises incorporating into natural tobacco, reconstituted tobacco or nontobacco substitute between about 0.0001 and 2 weight percent, based on composition weight, of a monocarbonate ester flavorant additive corresponding to the formula:

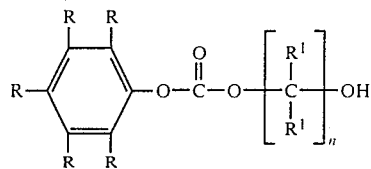

where R is a substituent selected from hydrogen, alkyl and alkoxyl groups, $R^1$ is a substituent selected from hydrogen and alkyl groups, and n is an integer between 3 and about 10.

The invention monocarbonate ester flavorant additive can be incorporated into the tobacco in accordance with methods known and used in the art. Preferably the flavorant additive is dissolved in a solvent such as water, alcohol, or mixtures thereof, and then sprayed or injected into the tobacco or non-tobacco substitute matrix. Such method ensures an even distribution of the flavorant additive throughout the tobacco, and thereby facilitates the production of a more uniform smoking composition. Alternatively, the flavorant may be incorporated as part of a concentrated tobacco extract which is applied to a fibrous tobacco web as in the manufacture of reconstituted tobacco. Another suitable procedure is to incorporate the flavorant in tobacco or non-tobacco substitute filler in a concentration between about 0.5–5 weight percent, based on the weight of filler, and then subsequently to blend the treated filler with filler which does not contain flavorant additive.

The term "non-tobacco substitute" is meant to include smoking filler materials such as are disclosed in U.S. Pat. Nos. 3,703,177; 3,796,222; 4,019,521; 4,079,742; and references cited therein, incorporated herein by reference.

U.S. Pat. No. 3,703,177 describes a process for preparing a non-tobacco smoking product from sugar beet pulp, which process involves the acid hydrolysis of the beet pulp to release beet pectins, and at least an alkaline earth treatment thereafter to cause crosslinking of the pectins and the formation of a binding agent for the exhausted beet matrix.

U.S. Pat. No. 3,796,222 describes a smoking product derived from coffee bean hulls. The hulls are treated with reagents that attack the alkaline earth metal crosslinks causing the release of the coffee pectins. The pectins act as a binding agent and together with the treated hulls may be handled and used similarly to a tobacco product.

U.S. Pat. No. 4,019,521 discloses a process for forming a smoking material which involves heating a cellulosic or carbohydrate material at a temperature of 150°–750° C. in an inert atmosphere for a period of time sufficient to effect a weight loss of at least 60 percent but not more than 90 percent.

U.S. Pat. No. 4,079,742 discloses a process for the manufacture of a synthetic smoking product from a cellulosic material, which process involves a pyrolysis step and a basic extraction step to yield a resultant matrix which has a tobacco-like brown color and has improved smoking characteristics.

The following Examples are further illustrative of the present invention. The specific ingredients and processing parameters are presented as being typical, and various modifications can be derived in view of the foregoing disclosure within the scope of the invention.

Examples I–VIII illustrate the preparation of monocarbonate ester compounds in accordance with the present invention. Infrared and nuclear magnetic resonance analyses are utilized to confirm the structure of each compound.

The monocarbonates of Examples IX–XIII are illustrative of unstable monocarbonate compounds which are not within the scope of the present invention.

Examples XIV and XV demonstrate the pyrolysis of invention monocarbonates to yield desired phenolic flavorant compounds.

EXAMPLE I

1-Phenoxycarbonyloxy-3-propanol

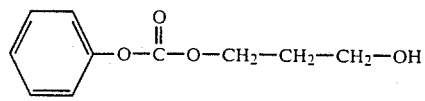

To a solution of 10.0 g of pyridine in 300 ml of methylene chloride is added with stirring 37.5 g (0.49 mole) of 1,3-propanediol. The resulting medium is chilled in an ice bath, and a solution of 15.5 g (0.099 mole) of phenyl chloroformate in 30 ml of methylene chloride is added dropwise. Stirring is continued for approximately 15 minutes while maintaining the temperature at 0° C., and then for 18–24 hours at room temperature.

Ether is added and the reaction mixture is washed with water, followed by a wash with aqueous saturated sodium bicarbonate. The organic layer is dried over $MgSO_4$ and evaporation of the solvent under reduced pressure yields a residue, to which toluene is added and then removed by evaporation under reduced pressure. The residue is purified by preparative thin layer chromatography on silica gel using chloroform as the eluent. A 9.3 g quantity of the product is obtained as a solid, m.p. 51°–52° C.

IR analysis indicates absorptions at 1756 and 3400 $cm^{-1}$ characteristic of acyclic carbonate and hydroxyl groups, respectively. NMR data confirm the above structure.

Anal. calc. for $C_{10}H_{12}O_4$: C, 61.22; H, 6.16; Found: C, 61.30; H, 6.20.

EXAMPLE II 1-(2-Methoxy-4-methylphenoxycarbonyloxy)-3-propanol

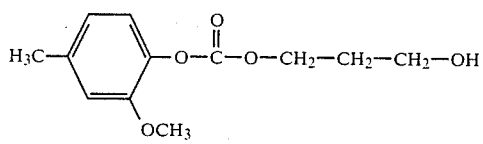

The reaction of 2-methoxy-4-methylphenyl chloroformate with 1,3-propanediol is conducted on a 0.05 mole scale employing the same conditions and purification procedure as described in Example I. A 6.6 g quantity of the pure product is obtained as an oil.

NMR and IR data confirm the above structure.

Anal. calc. for $C_{12}H_{16}O_5$: C, 59.99; H, 6.71; Found: C, 60.19; H, 6.85.

The reaction of 2-methoxy-4-allylphenyl chloroformate with 1,3-propanediol yields 1-(2-methoxy-4-allylphenoxycarbonyloxy)-3-propanol.

EXAMPLE III 1-(2-Methoxyphenoxycarbonyloxy)-3-propanol

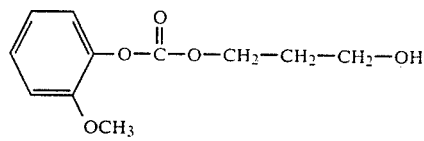

The reaction of 2-methoxyphenyl chloroformate with 1,3-propanediol is conducted on a 0.01 mole scale employing the same conditions as described in Example I, except that 20% ethyl acetate:hexane is used as the eluent for the chromatographic purification. A 1.1 g yield of the pure product is obtained as an oil.

NMR and IR data confirm the above structure.

Anal. calc. for $C_{11}H_{14}O_5$: C, 58.40; H, 6.24; Found: C, 58.31; H, 6.30.

The reaction of 2,4-dimethoxyphenyl chloroformate with 1,3-propanediol yields 1-(2,4-dimethoxyphenoxycarbonyloxy)-3-propanol.

The reaction of 2-propoxyphenol chloroformate with 1,3-propanediol yields 1-(2-propoxyphenoxycarbonyloxy)-3-propanol.

EXAMPLE IV 1-(2-Methoxyphenoxycarbonyloxy)-2,2-dimethyl-3-propanol

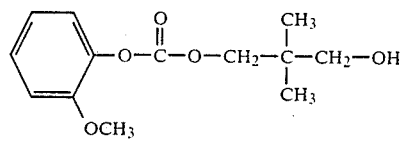

The reaction of 2-methoxyphenol chloroformate with 2,2-dimethyl-1,3-propanediol is conducted on a 0.01 mole scale employing the same conditions as described in Example III, except that the addition of the chloroformate solution is accomplished at room temperature. A 1.4 g yield of the pure product is obtained as an oil.

NMR and IR data confirm the above structure.

Anal. calc. for $C_{13}H_{18}O_5$: C, 61,41; H, 7.14; Found: C, 61.20; H, 7.34.

EXAMPLE V 2-(2-Methoxyphenoxycarbonyloxy)-4-pentanol

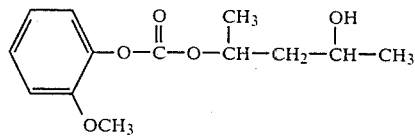

The reaction of 2-methoxyphenol chloroformate with 2,4-pentanediol is conducted on a 0.01 mole scale employing the same conditions as described in Example III. A 1.5 g yield of the pure product is obtained as an oil.

NMR and IR data confirm the above structure.

Anal. calc. for $C_{13}H_{18}O_5$: C, 61.41; H, 7.14; Found: C, 61.12; H, 7.10.

EXAMPLE VI 1-(2-Isopropyl-5-methylphenoxycarbonyloxy)-2,2-dimethyl-3-propanol

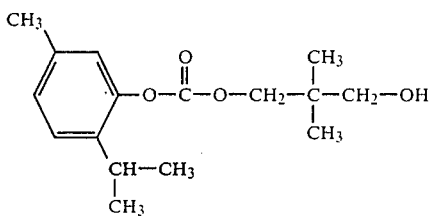

The reaction of 2-isopropyl-5-methylphenyl chloroformate with 2,2-dimethyl-1,3-propanediol is conducted on a 0.01 mole scale employing the same conditions as described in Example I. A 1.3 g yield of the pure product is obtained as an oil.

NMR and IR data confirm the above structure.

EXAMPLE VII 1-(2-Methoxyphenoxycarbonyloxy)-4-butanol

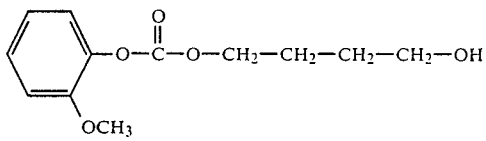

The reaction of 2-methoxyphenyl chloroformate with 1,4-butanediol is conducted on a 0.01 scale employing the same conditions as described in Example IV. A 1.5 g yield of the pure product is obtained as an oil.

NMR and IR data confirm the above structure.

Anal. calc. for $C_{12}H_{16}O_5$: C, 59.99; H, 6.71; Found: C, 59.76; H, 6.89.

EXAMPLE VIII 1-(2-Methoxyphenoxycarbonyloxy)-5-pentanol

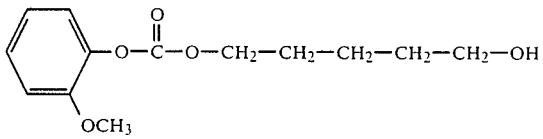

The reaction of 2-methoxyphenol chloroformate with 1,5-pentanediol is conducted on a 0.01 mole scale using the same conditions as described in Example IV. A 1.4 g yield of the pure product is obtained as an oil.

NMR and IR data confirm the above structure.

Anal. calc. for $C_{13}H_{18}O_5$: C, 61.41; H, 7.14; Found: C, 61.43; H, 7.15.

EXAMPLE IX 2-(2-Methoxy-4-formylphenoxycarbonyloxy)-4-pentanol

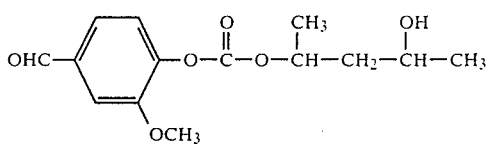

The reaction of 2-methoxy-4-formylphenyl chloroformate with 2,4-pentanediol is conducted on a 0.02 mole scale employing the same conditions as described in Example I. A 2.9 g yield of the pure product is obtained as an oil.

NMR and IR data confirm the above structure.

This material is less stable than the Examples I–VIII monocarbonates, and gradually decomposes when stored at room temperature.

EXAMPLE X

1-Phenoxycarbonyloxy glycerol

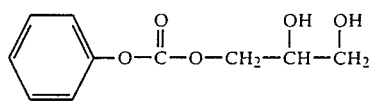

To 25 ml of 10% acetic acid is added 1.5 g (0.006 mole) of 1-O-phenoxycarbonyl-2,3-O-isopropylidene glycerol. The emulsion is stirred vigorously and heated at 60° C. for 2 hours. The resultant solution is cooled to room temperature and extracted several times with petroleum ether, and then with ethyl ether. The ethyl ether layer is washed with aqueous saturated sodium bicarbonate, dried over $MgSO_4$, and concentrated under reduced pressure to yield a residual liquid product. The liquid product is purified by preparative thin layer chromatography on silica gel using chloroform-:methanol 9:1 as the eluent. A 0.9 g yield of purified product is obtained as an oil. NMR and IR data confirm the above structure. The product is unstable and decomposes after standing at room temperature for several hours.

EXAMPLE XI 3-(2-Methoxy-4-methylphenoxycarbonyloxy)glycerol

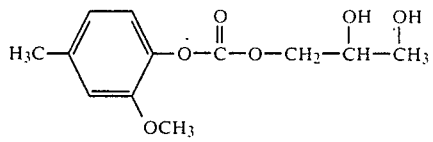

The conversion of 1-O-(2-methoxy-4-methylphenoxy)carbonyl-2,3-O-isopropylidine glycerol is conducted on a 0.005 mole scale employing the same conditions as described in Example X. A 0.9 g yield of the pure product is obtained as an oil. The structure is confirmed by NMR and IR analysis.

The product is unstable and decomposes after standing at room temperature for several hours.

EXAMPLE XII 1-(2-Methoxyphenoxycarbonyloxy)-2-ethanol

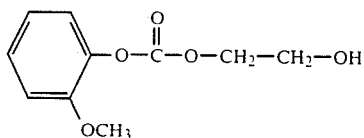

The reaction of 2-methoxyphenyl chloroformate with ethylene glycol is conducted on a 0.01 mole scale employing the same conditions as described in Example III. A 0.7 g yield of the pure product is obtained as an oil. The product is unstable and decomposes quantitatively after standing at room temperature for several hours.

EXAMPLE XIII 1-(2-Methoxyphenoxycarbonyloxy)-2-propanol

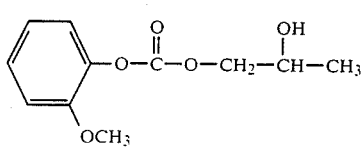

The reaction of 2-methoxyphenyl chloroformate with propylene glycol is conducted on a 0.01 mole scale employing the same conditions as described in Example III. A 0.9 g yield of the pure product is obtained as an oil.

The product is unstable and decomposes after standing at room temperature for several hours.

EXAMPLE XIV

This Example illustrates the pyrolysis of the Examples I-II monocarbonate compounds at 250° C.

A 10-50 mg sample of each of 1-phenoxycarbonyloxy-3-propanol (Ex. 1) and 1-(2-methoxy-4-methylphenoxycarbonyloxy)-3-propanol (Ex. 2) is pyrolyzed in a sealed tube at 250° for 10 minutes. The yield of the released phenolic component in each case is determined by gas chromatography:

| Compound | Phenolic Product | Yield, % |
|---|---|---|
| Ex. I | Phenol | 100 |
| Ex. II | 2-Methoxy-4-methylphenol | 95 |

When the above monocarbonates are employed as flavorant additives in tobacco compositions (0.0001%–2% w/w) under smoking conditions they impart improved flavor and aroma to cigarette mainstream and sidestream smoke.

EXAPLE XV

This Example illustrates the pyrolysis of the Examples III-V and VII-VIII monocarbonate compounds at 150° C.

A 10-50 mg sample of each of the Examples III-V and VII-VIII compounds is pyrolyzed in a sealed tube at 150° C. for 5 minutes. The yield of the released phenolic component in each case is determined by gas chromatography:

| Compound | Phenolic Product | Yield, % |
|---|---|---|
| Ex. III | Guaiacol | 67 |
| Ex. IV | Guaiacol | 95 |
| Ex. V | Guaiacol | 75 |
| Ex. VII | Guaiacol | 45 |
| Ex. VIII | Guaiacol | 10 |

When the above monocarbonates are employed as flavorant additives in tobacco compositions (0.0001%–2% w/w), under cigarette smoking conditions they impart improved flavor and aroma to mainstream and sidestream smoke.

What is claimed is:

1. A smoking composition comprising an admixture of (1) combustible filler selected from natural tobacco, reconstituted tobacco and non-tobacco substitutes, and (2) between about 0.0001 and 2 weight percent, based on the total weight of filler, of a monocarbonate ester flavorant corresponding to the formula:

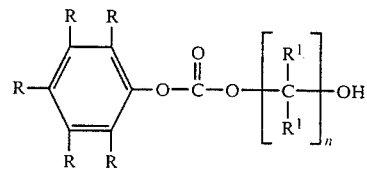

where R is a substituent selected from hydrogen, alkyl and alkoxy groups, $R^1$ is a substituent selected from hydrogen and alkyl groups, and n is an integer between 3 and about 10.

2. A smoking composition in accordance with claim 1 wherein the non-tobacco substitutes are selected from pectinaceous, cellulosic and other carbohydrate materials.

3. A smoking composition in accordance with claim 1 wherein the monocarbonate ester flavorant is 1-phenoxycarbonyloxy-3-propanol.

4. A smoking composition in accordance with claim 1 wherein the monocarbonate ester flavorant is 1-(2-methoxy-4-methylphenoxycarbonyloxy)-3-propanol.

5. A smoking composition in accordance with claim 1 wherein the monocarbonate ester flavorant is 1-(2-methoxyphenoxycarbonyloxy)-3-propanol.

6. A smoking composition in accordance with claim 1 wherein the monocarbonate ester flavorant is 1-(2-methoxyphenoxycarbonyloxy)-2,2-dimethyl-3-propanol.

7. A smoking composition in accordance with claim 1 wherein the monocarbonate ester flavorant is 2-(2-methoxyphenoxycarbonyloxy)-4-pentanol.

8. A smoking composition in accordance with claim 1 wherein the monocarbonate ester flavorant is 1-(2-methoxyphenoxycarbonyloxy)-4-butanol.

9. A smoking composition in accordance with claim 1 wherein the monocarbonate ester flavorant is 1-(2-isopropyl-5-methylphenoxycarbonyloxy)-2,2-dimethyl-3-propanol.

10. A smoking composition in accordance with claim 1 wherein the monocarbonate ester flavorant is 1-(2-methoxyphenoxycarbonyloxy)-5-pentanol.

11. A method of preparing a smoking composition which is adapted to impart flavoring to the mainstrean and sidestream smoke under smoking conditions, which method comprises incorporating into natural tobacco, reconstituted tobacco or non-tobacco substitute between about 0.0001 and 2 weight percent, based on composition weight, of a monocarbonate ester flavorant additive corresponding to the formula:
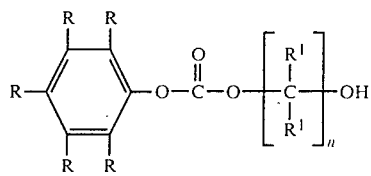
where R is a substituent selected from hydrogen, alkyl and alkoxy groups, $R^1$ is a substituent selected from hydrogen and alkyl groups, and n is an integer between 3 and about 10.
* * * * *